C. J. EHRLER.
FISHING DEVICE.
APPLICATION FILED OCT. 19, 1916.
1,230,467.
Patented June 19, 1917.
2 SHEETS—SHEET 1.
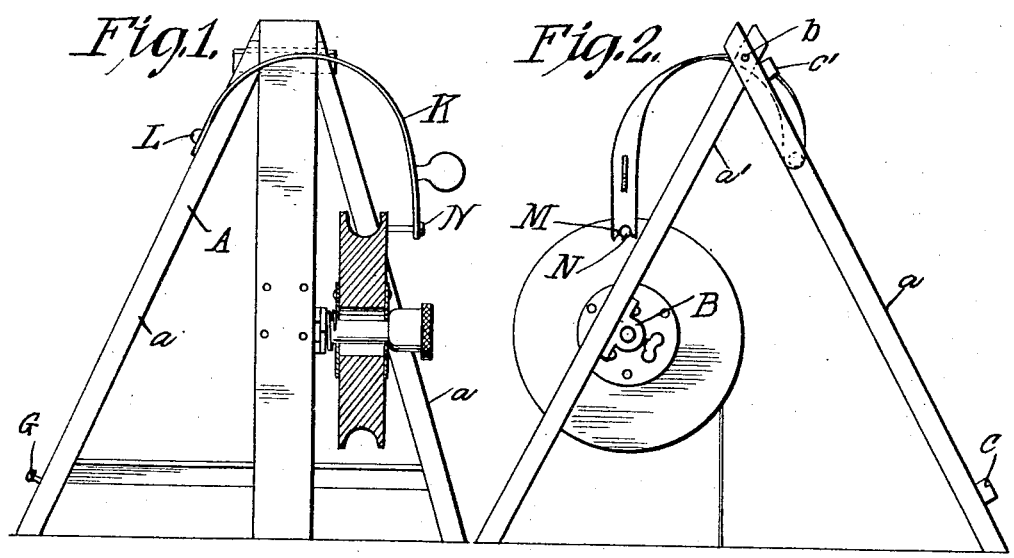
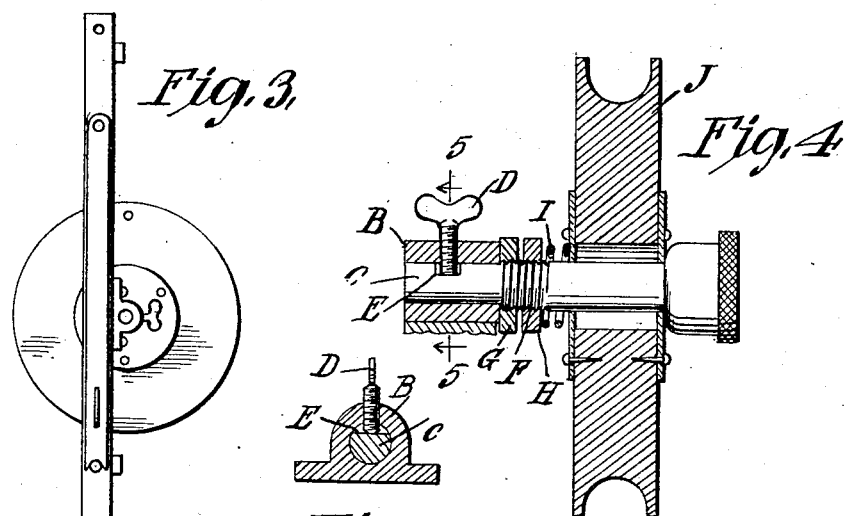

C. J. EHRLER.
FISHING DEVICE.
APPLICATION FILED OCT. 19, 1916.
1,230,467.
Patented June 19, 1917.
2 SHEETS—SHEET 2.
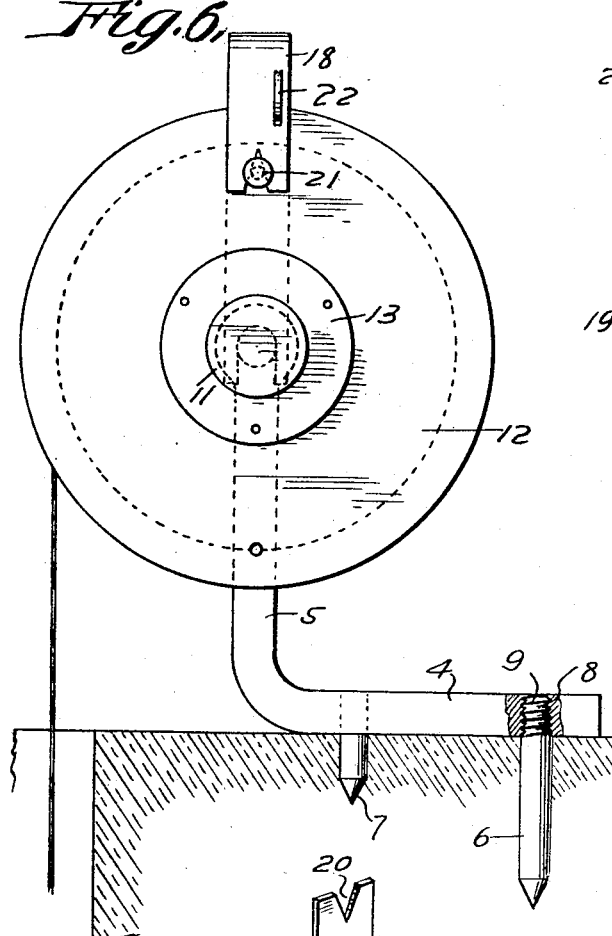
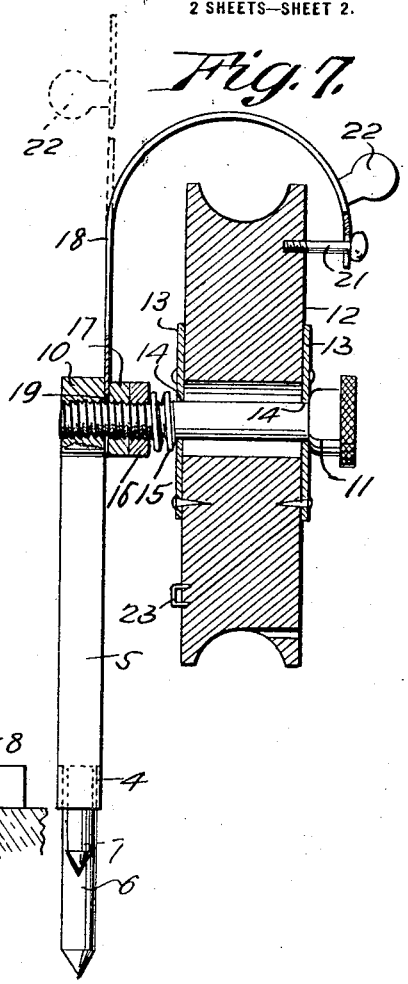
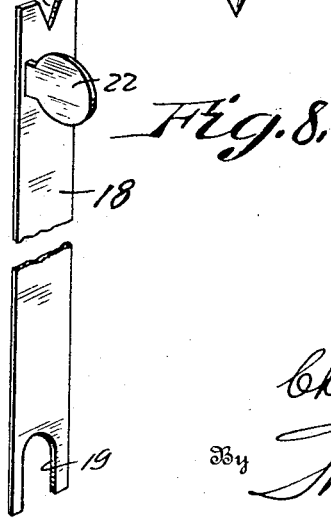

UNITED STATES PATENT OFFICE.

CHARLES J. EHRLER, OF PITTSFIELD, MASSACHUSETTS.

FISHING DEVICE.

1,230,467.   Specification of Letters Patent.   Patented June 19, 1917.

Application filed October 19, 1916. Serial No. 126,564.

*To all whom it may concern:*

Be it known that I, CHARLES J. EHRLER, a citizen of the United States of America, and resident of Pittsfield, in the county of Berkshire and State of Massachusetts, have invented certain new and useful Improvements in Fishing Devices, of which the following is a specification.

This invention relates to fishing devices and particularly to a sign adapted to be attached to a fishing reel to be used for fishing through ice.

An object of this invention is to provide a reel with a suitable support on which it may be rotated, means being provided for holding a signal while the reel is stationary and for releasing the said signal upon rotation of the signal so that an attendant or fisherman may, by looking over the fishing ground, detect which, if any, reels have been disturbed as would be the case should a fish run out with the line which had previously been wound on the reel.

A further object of this invention is to provide a signal of the character indicated which can be applied to reels now in common use without material change in said reels, the said invention furthermore having advantages in that it can be constructed at a very small cost whereas its durability is pronounced because of the fact that it is made of resilient material and therefore the signal is self-righting.

With the foregoing and other objects in view, the invention consists in the details of construction, and in the arrangement and combination of parts to be hereinafter more fully set forth and claimed.

In describing the invention in detail, reference will be had to the accompanying drawing forming part of this specification wherein like characters denote corresponding parts in the several views, and in which—

Figure 1 illustrates a view in elevation of the device, the reel being in section;

Fig. 2 illustrates a view in elevation, taken from a position at right angles from that shown in Fig. 1;

Fig. 3 illustrates a view in elevation of the device folded;

Fig. 4 illustrates an enlarged detail sectional view of the reel and the spindle therefor;

Fig. 5 illustrates a sectional view on the line 5—5 of Fig. 4;

Fig. 6 illustrates a view in elevation of a fishing device embodying a slight modification;

Fig. 7 illustrates a view at right angles to that shown in Fig. 6 with the reel in section; and Fig. 8 illustrates a perspective view of the signal.

In these drawings A denotes the stand or tripod, the said tripod having a bearing or bracket B thereon in which the end of a spindle C is anchored by the set screw D, the said spindle having a cut away portion E forming a seat for the end of the set screw. The spindle is threaded as at F and nuts G and H are threaded thereon, one of said nuts being intended to bear against the spring I and the other of said nuts constituting a set nut to hold the nut which bears against the spring in its adjusted position. A reel J is rotatable on the spindle and the said reel may be of any ordinary construction.

The flag or signal comprises a strip of resilient material K secured to the frame by the fastening L and the said strip of material K has a notch M in its end to fit a stud N so that when a reel is set, the stud will be seated in the notch and the flag will be held down. When the reel is rotated, the stud is unseated from the notch of the spring or strip of material and the same will spring upward to an approximate vertical position so that the attendant may know that the reel has been rotated and that there is a strike on the line, the reel of which has been disturbed. A signal or indicator O is secured to the flag plate so that it may be more readily observed by the attendant. There is a stud or pin P carried by the frame to engage the notch on the end of the resilient member when the parts are in the folded position shown in Fig. 3.

The members *a* and *a'* of the frame are pivoted on the bolt or rod *b* and the members *a* have connecting members *c* and *c'* which stabilize the structure and form abutments to limit the movement of the members on their pivot.

In the modification shown in Figs. 6, 7 and 8, 4 denotes a base of a bracket and 5 a standard rising therefrom, the said base being provided with spurs 6 and 7 adapted to be embedded in the ice, the said spurs having threaded upper ends, as shown at 8, which enter sockets 9 formed in the base.

The standard 5 at its upper end has a threaded aperture 10, the threads of which engage a spindle 11 on which the reel 12 is rotatable. In the present embodiment of the invention, the reel 12 is preferably provided with a central aperture and each side of the reel has an apertured plate 13, the aperture 14 of which is of a size to receive the spindle 11, hence the plates and spindle form a bearing to permit freer rotation of the reel.

In order to prevent too free rotation of the reel on the spindle, a spring 15 is applied to the said spindle and interposed between the back disk or plate 13 and a nut 13ª which is threaded on the spindle and is effective to increase or diminish the tension of the spring, as stated. There is another nut 17 on the said spindle which coacts with the standard 5 to clamp the resilient plate 18, the said plate being here shown as having a bifurcated end 19 to fit over the spindle whereas the clamping nut 17 is moved to frictionally hold the said spring or plate. The outer or upper end of the spring has a notch 20 which receives a pin or screw 21 extending from the side of the reel, said pin having a head to prevent accidental disengagement of the plate, but the relation of parts is such that upon partial rotation of the said reel, the member will be drawn from the notch of the plate, thereby permitting the said plate to spring to the position shown in dotted lines in Fig. 7 and as the said plate carries a flag or signal 22, it follows that an attendant may observe when a reel has been disturbed.

A staple 23 has its ends embedded in the reel and the looped portion thereof engages a hook which is to be used for fishing when the line is wound on the reel.

I claim:

1. In a fishing device, a standard having means for its anchorage, a spindle threaded in the upper end of the standard, a reel rotatably mounted thereon, a nut on the said spindle, a tensioning device interposed between the nut and the reel, a resilient plate clamped to the standard, said plate having a notch in its end, a member on the reel entering the said notch when the plate is bent, and a flag carried by the said plate.

2. In a fishing device, a standard, a spindle threaded therein, a nut threaded on the spindle, a tensioning device between the said nut and the said reel for retarding the rotation of the said reel, a resilient plate, means for clamping the resilient plate to the standard, said resilient plate having a notch in its end, and means on the said reel lying in the notch of the plate to hold the plate in bent position.

3. In a fishing device, a standard, a shank connected thereto, a reel having apertured plates attached to the side thereof through which the shank extends, the said plates and shank constituting a bearing for the reel, a resilient plate, means for clamping the resilient plate to the standard, and means on the said reel to hold the resilient plate in bent position.

CHARLES J. EHRLER.

Copies of this patent may be obtained for five cents each, by addressing the "Commissioner of Patents, Washington, D. C."